US009062822B2

(12) United States Patent
Han et al.

(10) Patent No.: US 9,062,822 B2
(45) Date of Patent: Jun. 23, 2015

(54) STAND DEVICE FOR MOBILE TERMINAL

(75) Inventors: Jung-Eun Han, Suwon-si (KR);
Sun-Young Lee, Eumseong-gun (KR)

(73) Assignee: Samsung Electronics Co., Ltd., Suwon-si (KR)

(*) Notice: Subject to any disclaimer, the term of this patent is extended or adjusted under 35 U.S.C. 154(b) by 101 days.

(21) Appl. No.: 13/433,826

(22) Filed: Mar. 29, 2012

(65) Prior Publication Data
US 2012/0261542 A1    Oct. 18, 2012

(30) Foreign Application Priority Data

Apr. 12, 2011    (KR) .................. 10-2011-0033763

(51) Int. Cl.
*F16M 11/10*    (2006.01)
*A63H 15/00*    (2006.01)
*F16M 13/00*    (2006.01)

(52) U.S. Cl.
CPC ................ *F16M 11/10* (2013.01); *A63H 15/00* (2013.01); *F16M 13/00* (2013.01); *F16M 2200/041* (2013.01); *F16M 2200/08* (2013.01)

(58) Field of Classification Search
CPC . F16M 11/10; F16M 11/125; F16M 11/2057; F16M 13/00; F16M 2200/08; F16M 2200/041; A63H 15/00; A63H 15/04; A63H 15/06
USPC ............ 248/289.31, 144, 145, 346.06, 346.2, 248/910, 915, 917, 285.1, 143; 446/267, 446/258, 32, 369, 390, 396, 422, 269, 273, 446/325; 40/602, 606.18, 607.1, 608, 409
See application file for complete search history.

(56) References Cited

U.S. PATENT DOCUMENTS

| | | | | |
|---|---|---|---|---|
| 1,861,171 A * | 5/1932 | Zimmermann | ............... | 211/69.6 |
| 2,833,244 A * | 5/1958 | Bohlman | ....................... | 119/708 |
| 3,252,242 A * | 5/1966 | Zalkind | ......................... | 446/325 |
| 4,553,346 A * | 11/1985 | Glasener | ........................ | 40/602 |
| 5,100,360 A | 3/1992 | Entzel | | |
| 6,165,041 A * | 12/2000 | Lin | ............................... | 446/267 |
| 6,612,943 B2 * | 9/2003 | Beers | ........................... | 473/451 |
| 7,028,428 B1 * | 4/2006 | Spencer | ........................ | 446/325 |
| 7,806,260 B2 * | 10/2010 | Chun | ............................. | 206/320 |
| 7,819,373 B1 * | 10/2010 | Tsai et al. | ................. | 248/346.2 |
| 2005/0255895 A1 | 11/2005 | Lee et al. | | |
| 2006/0076857 A1 * | 4/2006 | Hsieh et al. | ............... | 312/223.2 |
| 2008/0108395 A1 | 5/2008 | Lee et al. | | |

FOREIGN PATENT DOCUMENTS

| | | |
|---|---|---|
| CN | 101141860 A | 3/2008 |
| KR | 10-2012-0063412 A | 6/2012 |
| TW | M264785 U | 5/2005 |

* cited by examiner

*Primary Examiner* — Tan Le
(74) *Attorney, Agent, or Firm* — Jefferson IP Law, LLP

(57) ABSTRACT

A stand device for a mobile terminal is provided. The device includes a body and at least one slope unit. The body has a seat and a lower side. The seat seats the mobile terminal thereon. The lower side of the body is curved so that the body may be tilted. The at least one slope unit tilts the body in a relevant direction by moving a center of mass.

14 Claims, 6 Drawing Sheets

STAND DEVICE FOR MOBILE TERMINAL

PRIORITY

This application claims the benefit under 35 U.S.C. §119(a) of a Korean patent application filed in the Korean Intellectual Property Office on Apr. 12, 2011 and assigned Serial No. 10-2011-0033763, the entire disclosure of which is hereby incorporated by reference.

BACKGROUND OF THE INVENTION

1. Field of the Invention

The present invention relates to a stand device for a mobile terminal. More particularly, the present invention relates to a stand device that can stand a mobile terminal at various angles.

2. Description of the Related Art

Currently, with development of electronic communication industries, mobile terminals such as a mobile communication terminal, an electronic scheduler, a Personal Digital Assistant (PDA), etc. have become necessities of a modern society and play an important role of transferring information. As is well known, such mobile terminals provide various multimedia services (for example, photos, moving pictures, etc.) based on the Internet.

Generally, these mobile terminals are gripped by a user's hand during their use. Otherwise, a user may put the mobile terminal on a flat surface or put the mobile terminal on a stand device during its use. In the case where the stand device is used, the user has an advantage of manipulating the mobile terminal while standing a screen of the mobile terminal suitable for his eyes and viewing the screen compared to a case of putting the mobile terminal on the surface and using it.

FIG. 1 illustrates a stand device of the related art.

Referring to FIG. 1, the stand device 100 supports a mobile terminal 10. However, since the stand device 100 cannot adjust an angle at which the mobile terminal 10 is displayed, the stand device 100 may be inconvenient to a user. For example, a user has to adjust his eyes in a subordinative manner in order to clearly view the screen displayed at only a fixed angle.

Therefore, a need exists for a stand device that allows for adjusting the screen of the mobile terminal at multiple angles while the mobile terminal rests on the stand device, so a user does not have to adjust his eyes in order to clearly view the screen.

SUMMARY OF THE INVENTION

Aspects of the present invention are to address at least the above-mentioned problems and/or disadvantages and to provide at least the advantages described below. Accordingly, an aspect of the present invention is to provide a stand device for a mobile terminal, capable of easily putting and standing the mobile terminal.

Another aspect of the present invention is to provide a stand device for a mobile terminal that stands the mobile terminal at various angles.

Yet another aspect of the present invention is to provide a stand device for a mobile terminal, capable of tilting the mobile terminal in various directions.

In accordance with an aspect of the present invention, a stand device for a mobile terminal is provided. The device includes a body having a seat for seating the mobile terminal thereon and having a lower side that is curved for tilting the body, and at least one slope unit for tilting the body in a direction by moving a center of mass.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a stand device for a mobile terminal. More particularly, exemplary embodiments of the present invention provide a stand device that can stand a mobile terminal at various angles.

FIGS. 2 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
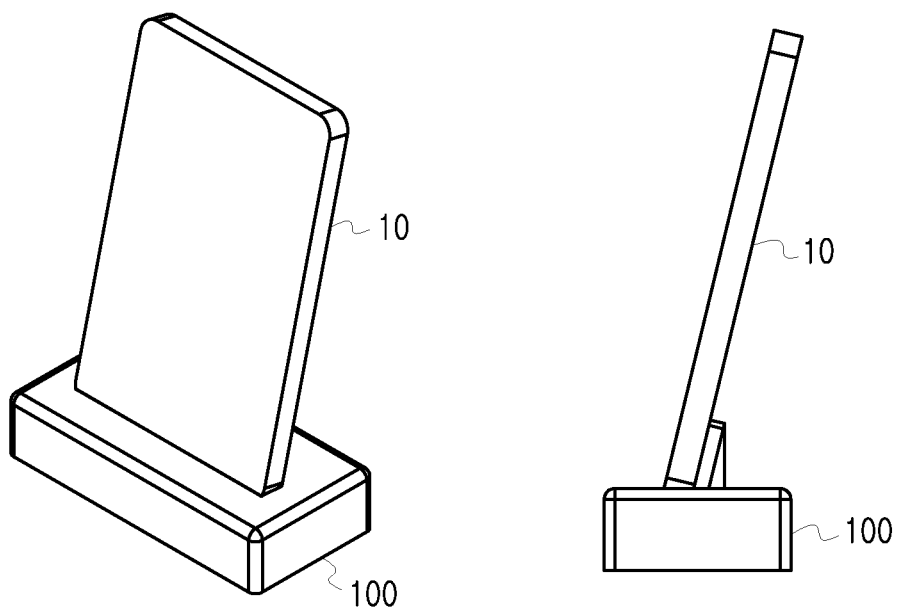
FIG. 1 is a view illustrating a stand device according to the related art.
Figure 2:
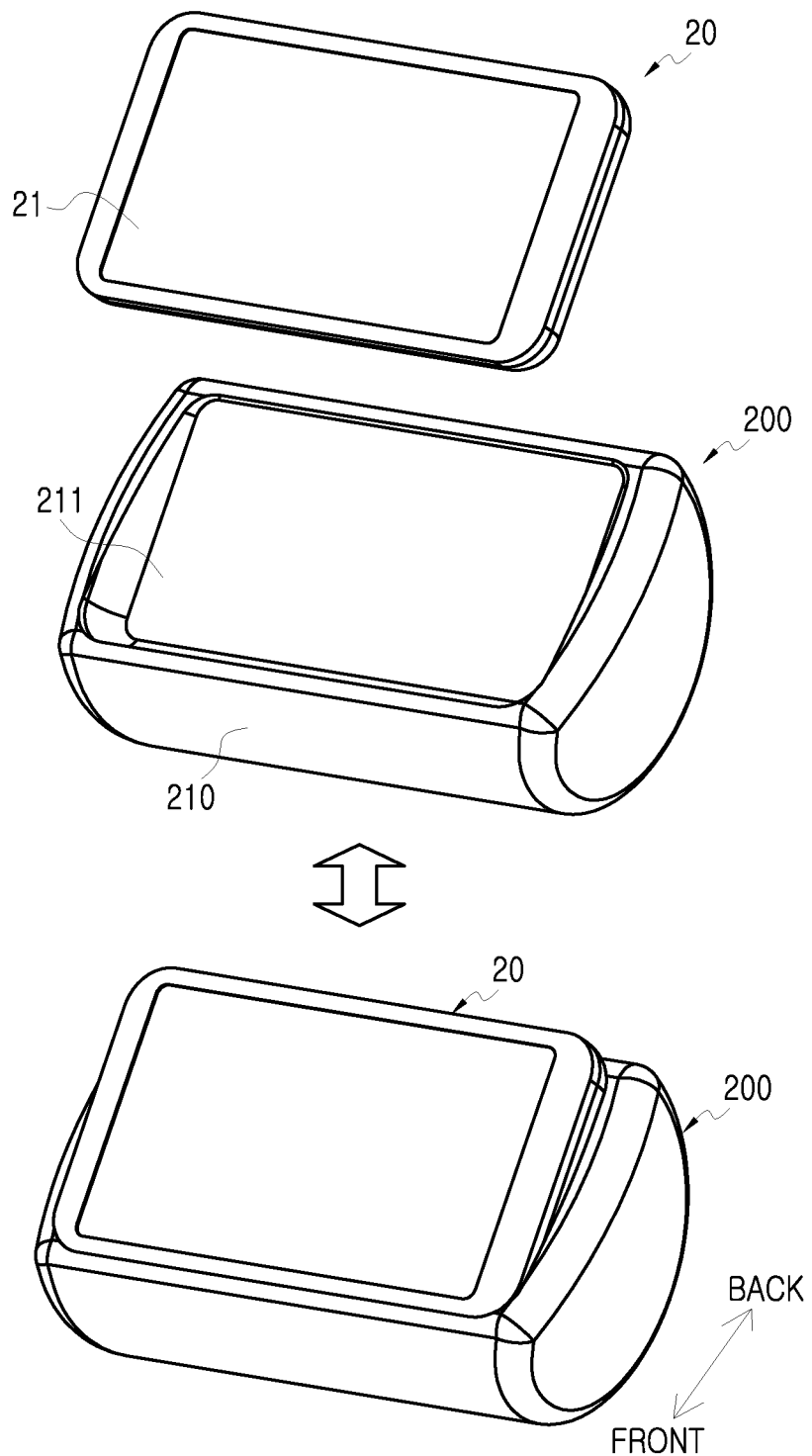
FIG. 2 is a perspective view illustrating a stand device according to an exemplary embodiment of the present invention.

FIG. 2 is a perspective view illustrating a stand device according to an exemplary embodiment of the present invention.

Referring to FIG. 2, a mobile terminal 20 is attachable/detachable to/from a stand device 200 according to an exemplary embodiment of the present invention. The mobile terminal 20 may include known elements such as a Liquid Crystal Display (LCD), a keypad, a speaker, a microphone, etc. In an exemplary case where the mobile terminal 20 includes a touch screen, a user may view and manipulate applications via one screen. Even when the mobile terminal 20 is put on the stand device 200, a screen 21 is exposed so that it may be viewed. An electronic device other than the mobile terminal may also be used in another exemplary embodiment of the present invention.

The stand device 200 has a seat 211 for seating the mobile terminal 20 thereon and includes a body 210 having a lower side that is rounded so that it may be tilted. According to an exemplary embodiment of the present invention, the body 210 may be tilted in a back and forth direction, and the mobile terminal 20 put on the stand device may be also tilted in the same direction. This suggests that the screen may be tilted in a back and forth direction suitable for viewing by a user. As illustrated, the lower side of the body 210, that is, a side that contacts a surface such as a countertop, has a rounded shape in the back and forth direction. In addition, the stand device 200 includes a slope unit for tilting and maintaining the body 210.

Figure 3:
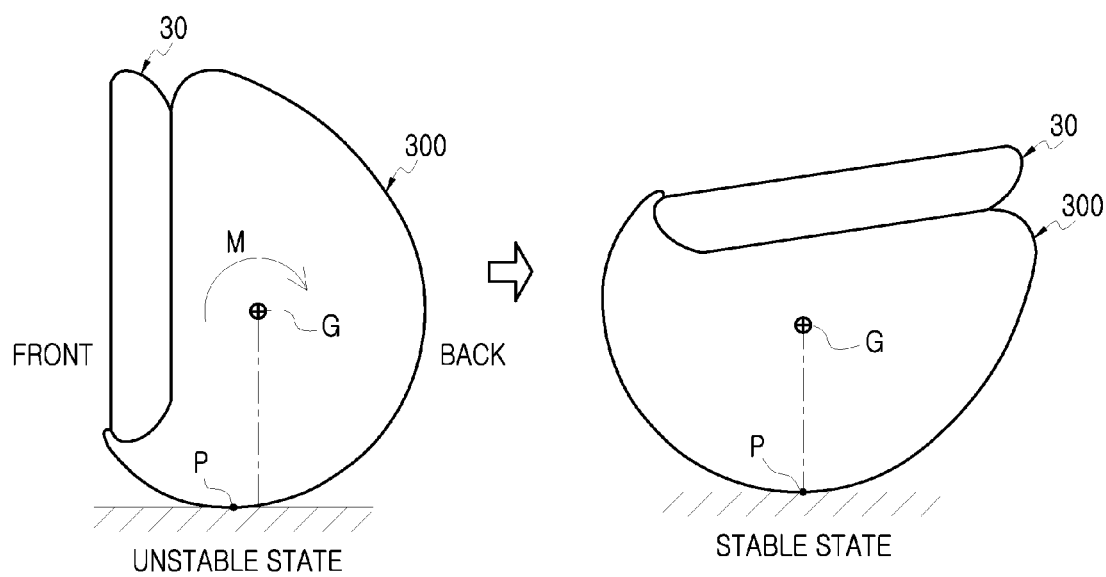
FIG. 3 is a view illustrating an operation of a stand device in the case where a slope unit is not provided according to an exemplary embodiment of the present invention.

FIG. 3 is a view illustrating an operation of a stand device in the case where a slope unit is not provided according to an exemplary embodiment of the present invention.

Referring to FIG. 3, since the stand device 300 supports a mobile terminal 30, a description of a state where the mobile terminal 30 is not put on the stand device 300 is omitted. A center of mass G corresponding to the two combined devices, that is, the stand device 300 on which the mobile terminal 30 is put, exists. For example, when a user tilts the stand device 300 on which the mobile terminal 30 is put to the front and releases his grip, the center of mass G is located at the right of a rotation point P, that is, a point where the lower side of the stand device 300 and a support surface contact each other, so that a moment M of a clockwise direction occurs. Due to the right side moment, the stand device 300 on which the mobile terminal 30 is put rotates to the right to restore to a stable state. As illustrated, since the directions of the center of mass G and the rotation point P are the direction of gravity in a stable state, they coincide with each other. At this point, the stand device 300 on which the mobile terminal 30 is put repeats a motion of tilting back and forth alternatively and finally restores to the stable state.

Figure 4:
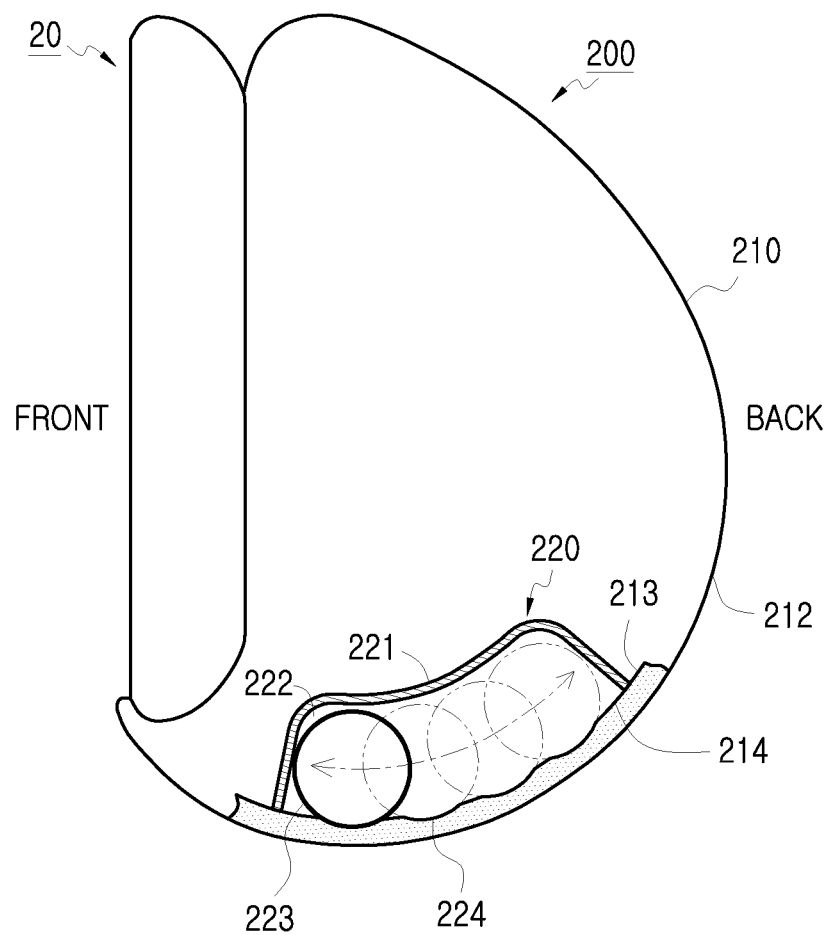
FIG. 4 is a view illustrating a slope unit provided to a stand device according to an exemplary embodiment of the present invention.

FIG. 4 is a view illustrating a slope unit provided to a stand device according to an exemplary embodiment of the present invention.

Referring to FIG. 4, a slope unit 220 according to an exemplary embodiment of the present invention includes a housing 221 forming a predetermined space 222 together with an inner side 213 of the body 210, and a weight member 223 movable along a curved portion 214 of the inner side 213 in the space 222. When the stand device 200 is tilted to the front, the weight member 223 moves to the front along the curved portion 214. When the stand device 200 on which the mobile terminal 20 is put is tilted to the back, the weight member 223 moves to the back along the curved portion 214.

To maintain the stand device 200 at a desired slope, the slope unit 220 may lean to the lower side 212 of the body 210 and the center of mass may lean to the slope unit 220 and toward the weight member 223. Therefore, the center of mass may be positioned toward the weight member 223 by making the mass of the weight member 223 relatively large. Consequently, the center of mass at a state of combination of the stand device 200 including the slope unit 220 and the mobile terminal 20 put on the stand device 200 changes its position depending on movement of the weight member 223. That is, when the position of the weight member 223 is determined, the slope of the stand device 200 is determined. In other words, the slope unit 220 tilts the body 210 in a direction by moving the center of mass. The weight member 223 may have a shape that allows the weight member 223 to slide or roll (for example, a sphere, a cylinder, etc.).

Furthermore, the stand device 220 may further have at least one groove 224 for restraining movement of the weight member 223 in order to adjust a degree of being tilted step by step at the curved portion 214. The weight member 223 is caught at the recessed groove 224 and so that its movement is disturbed. When a user tilts the stand device 200 further, the weight member 223 may move to the next or previous groove. When the groove 224 is absent, the screen may be stood at a minute angle, but since the weight member 223 without the groove 224 may freely move, the slope of the body 210 may easily change. In addition, when a slope is adjusted at the state where the groove 224 is absent, the weight member 223 may repeatedly move and then stop like a pendulum, and a user may have to grip the stand device 200 until the weight member 223 stops.

Figure 5:
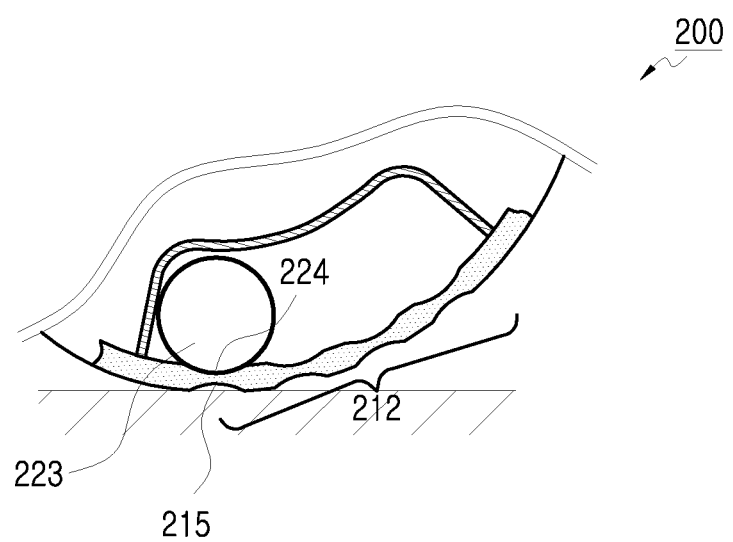
FIG. 5 is a view illustrating a unit for restraining a stand device, tilted by a determined position of a weight member, from shaking according to an exemplary embodiment of the present invention.

FIG. 5 is a view illustrating a unit for restraining a stand device, tilted by a determined position of a weight member, from shaking according to an exemplary embodiment of the present invention.

Referring to FIG. 5, when the weight member 223 is caught at the groove 224, since the lower side 212 of the stand device 200 is rounded, the stand device 200 may rock back and forth. Therefore, the stand device 200, according to an exemplary embodiment of the present invention may further include at least one groove 215 formed in the lower side 212. The groove 215 restrains the stand device 200, tilted by the weight member 223 whose position has been determined, from shaking. Accordingly, it is preferable that the groove 215 is formed to correspond to the groove 224 formed in the slope unit 220.

Furthermore, the mobile terminal may provide a vertical screen view or a horizontal screen view. Accordingly, the stand device 200 may include a unit that may put the mobile terminal on the seat 211 and pivot the mobile terminal.

In addition, the stand device according to an exemplary embodiment of the present invention may have a construction that can adjust a slope in not only the back and forth direction but in eight directions. Accordingly, the body 210 has a shape that allows the body 210 to tilt in eight directions (for example, a sphere), and may further include the same slope unit disposed in a left and right direction as well as a slope unit disposed in the back and forth direction. Therefore, a user may tilt the stand device to not only the front, back, right, and left, but also a combined direction (for example, a front left direction, etc.).

In addition, the user may fit the mobile terminal with various ornaments for decorating an appearance, and accordingly, the weight of the mobile terminal increases. When the mobile terminal having an increased weight is put on the stand device 200, the center of mass may deviate from a predetermined position. In addition, the center of mass in the case where the mobile terminal put on the stand device 200 is pivoted to the vertical view is different from the center of mass in the case where the mobile terminal put on the stand device 200 is pivoted to the horizontal view. Therefore, as described above, the center of mass may lean to the weight member 223 by making mass of the weight member 223 relatively large.

Figure 6:
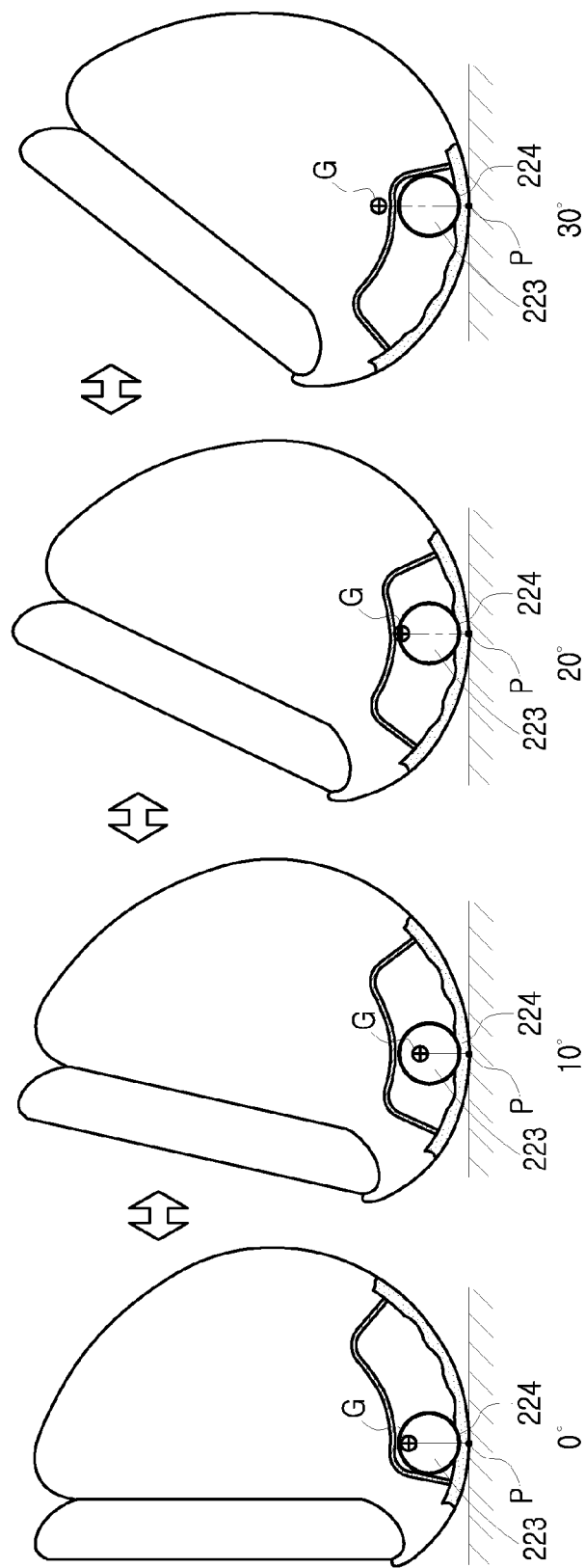
FIG. 6 is a view illustrating a stand device, having a mobile terminal thereon, tilted depending on the position of a weight member according to an exemplary embodiment of the present invention.

FIG. 6 is a view illustrating a stand device, having a mobile terminal thereon, is tilted depending on the position of a weight member according to an exemplary embodiment of the present invention.

Referring to FIG. 6, an angle (for example, 0°, 10°, 20°, 30°) to which the screen put on the stand device tilts changes depending on the groove 224 on which the weight member 223 is positioned. As illustrated, when the weight member 223 moves, the center of mass corresponding to the combination of the mobile terminal and the stand device is positioned inside the slope unit or in the neighborhood. As described above, the center of mass may exist in the weight member 223 by making the mass of the weight member 223 relatively large.

Consequently, the stand device for the mobile terminal according to an exemplary embodiment may easily adjust an angle at which the mobile terminal is displayed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A stand device for a mobile terminal, the device comprising:
   a body including a seat structured to seat the mobile terminal thereon and including a lower side that is curved for tilting the body; and
   at least one slope unit structured to tilt the body in a direction by moving a center of mass of the stand device while the mobile terminal is seated thereon,
   wherein the at least one slope unit comprises:
      a movable weight member;
      a housing for guiding a movement of the movable weight member; and
      at least one groove formed in the housing and for restraining the movement of the movable weight member.

2. The device of claim 1, wherein the at least one slope unit leans toward the lower side of the body.

3. The device of claim 1, wherein the movable weight member slides or rolls to move.

4. The device of claim 1, wherein the center of mass leans toward the movable weight member.

5. The device of claim 1, further comprising at least one groove formed in the lower side of the body, for restraining the body from tilting.

6. The device of claim 1, wherein the seat comprises a unit for pivoting a seated mobile terminal.

7. The device of claim 1, wherein the at least one slope unit is configured to tilt the body in eight directions.

8. A stand device for an electronic device, the device comprising:
   a body including a seat structured to seat the electronic device thereon and including a rounded lower side; and
   at least one slope unit structured to tilt the body in a direction by moving a center of mass of the stand device while the electronic device is seated thereon,
   wherein the at least one slope unit comprises:
      a movable weight member;
      a housing for guiding a movement of the movable weight member; and
      at least one groove formed in the housing and for restraining the movement of the movable weight member.

9. The device of claim 8, wherein the at least one slope unit leans toward the lower side of the body.

10. The device of claim 8, wherein the movable weight member slides or rolls to move.

11. The device of claim 8, wherein the center of mass leans toward the movable weight member.

12. The device of claim 8, further comprising at least one groove formed in the lower side of the body, for restraining the body from tilting.

13. The device of claim 8, wherein the seat comprises a unit for pivoting a seated electronic device.

14. The device of claim 8, wherein the at least one slope unit is configured to tilt the body in eight directions.

* * * * *